United States Patent [19]
Vendely et al.

[11] Patent Number: 4,878,035
[45] Date of Patent: Oct. 31, 1989

[54] HYBRID FREQUENCY SHIFT KEYING MODULATOR AND METHOD

[75] Inventors: John A. Vendely; David M. Badger, both of Indianapolis, Ind.

[73] Assignee: Wavetek RF Products, Inc., Indianapolis, Ind.

[21] Appl. No.: 200,075

[22] Filed: May 27, 1988

[51] Int. Cl.⁴ .............................................. H03C 3/00
[52] U.S. Cl. ................................................... 332/101
[58] Field of Search ...................... 332/16 R, 19, 23 R; 375/23, 45, 48, 62, 65

[56] References Cited

U.S. PATENT DOCUMENTS

| | | | |
|---|---|---|---|
| 3,801,912 | 4/1974 | Ragadale | 375/45 |
| 3,902,013 | 8/1975 | Charbonnier | 375/62 |
| 3,958,191 | 5/1976 | Jones, Jr. | 332/1 |
| 3,987,374 | 10/1976 | Jones, Jr. | 332/9 R |
| 3,991,389 | 11/1976 | Dwire et al. | 332/9 R |
| 4,003,001 | 1/1977 | Jones, Jr. | 332/1 |
| 4,083,008 | 4/1978 | Eschke | 375/62 |
| 4,259,648 | 3/1981 | Farrow | 332/9 R |
| 4,471,328 | 9/1984 | Chapman | 332/9 R |
| 4,481,489 | 11/1984 | Kurby | 332/19 |
| 4,492,936 | 1/1985 | Albarello et al. | 332/19 |
| 4,556,866 | 12/1985 | Gorecki | 340/310 A |
| 4,580,276 | 4/1986 | Andruzzi, Jr. et al. | 375/42 |
| 4,599,583 | 7/1986 | Shimozono et al. | 332/9 R |
| 4,612,652 | 9/1986 | Kadin | 375/1 |

Primary Examiner—David Mis
Attorney, Agent, or Firm—Donald J. Lisa

[57] ABSTRACT

A hybrid frequency shift keying modulator and method produces binary FSK by simultaneously applying a digital modulating signal to the DDS section of a frequency synthesizer along with a coordinated analog modulating signal as direct frequency modulation of the accompanying PLL section. Low frequency performance is derived from the characteristics of the DDS modulation and the high frequency performance and accurate wave shape reproduction are derived from the modulation of the direct FM section.

34 Claims, 8 Drawing Sheets

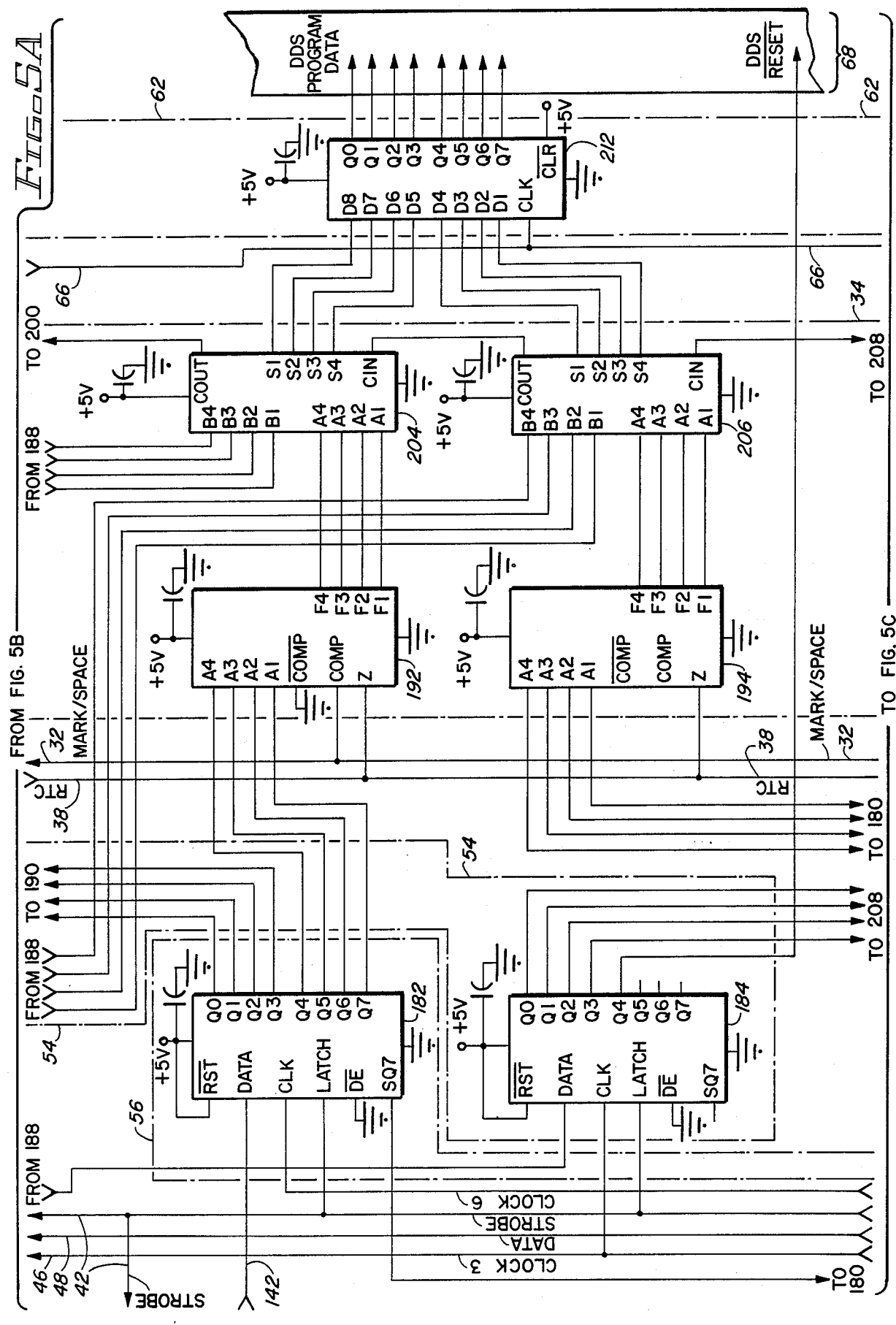

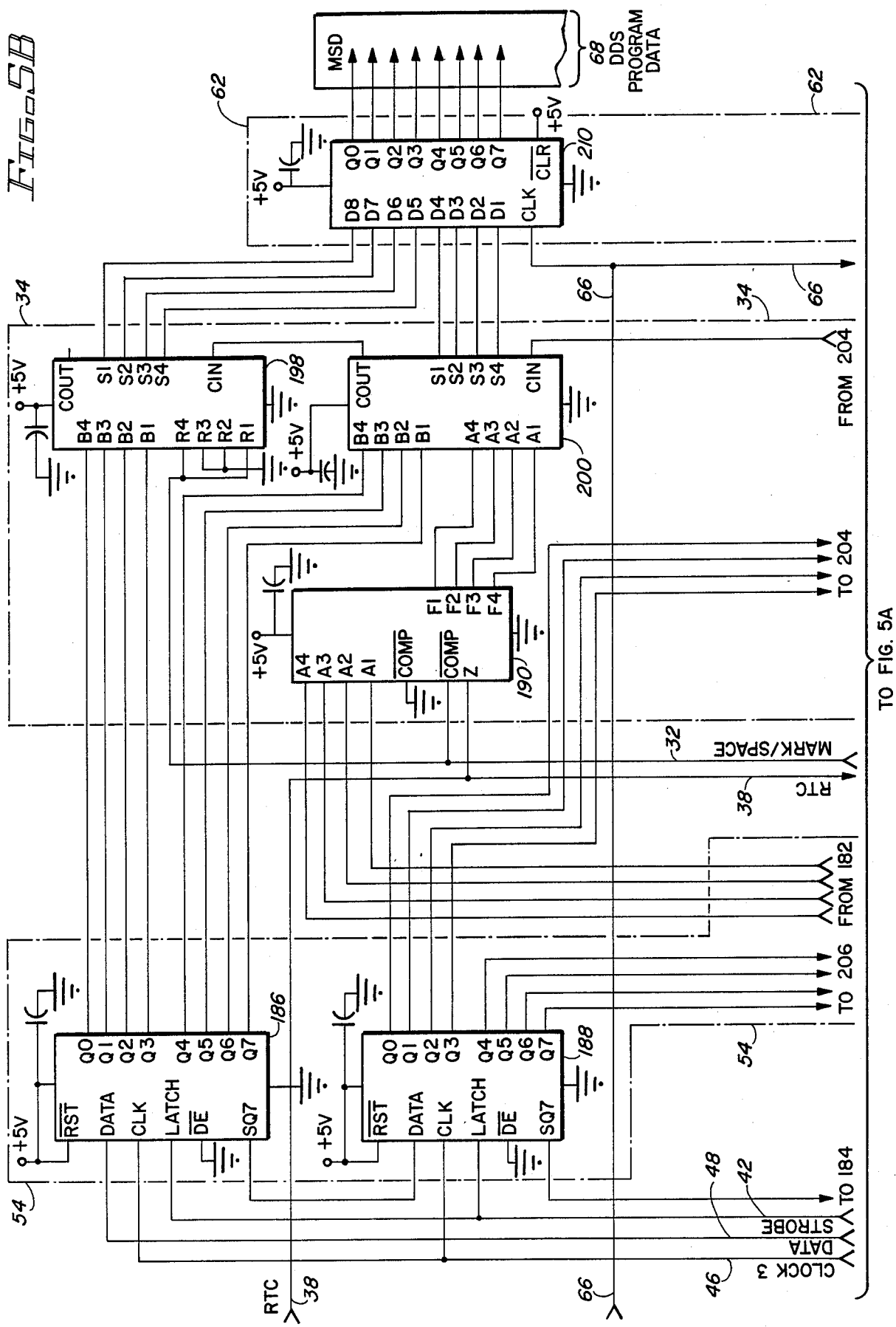

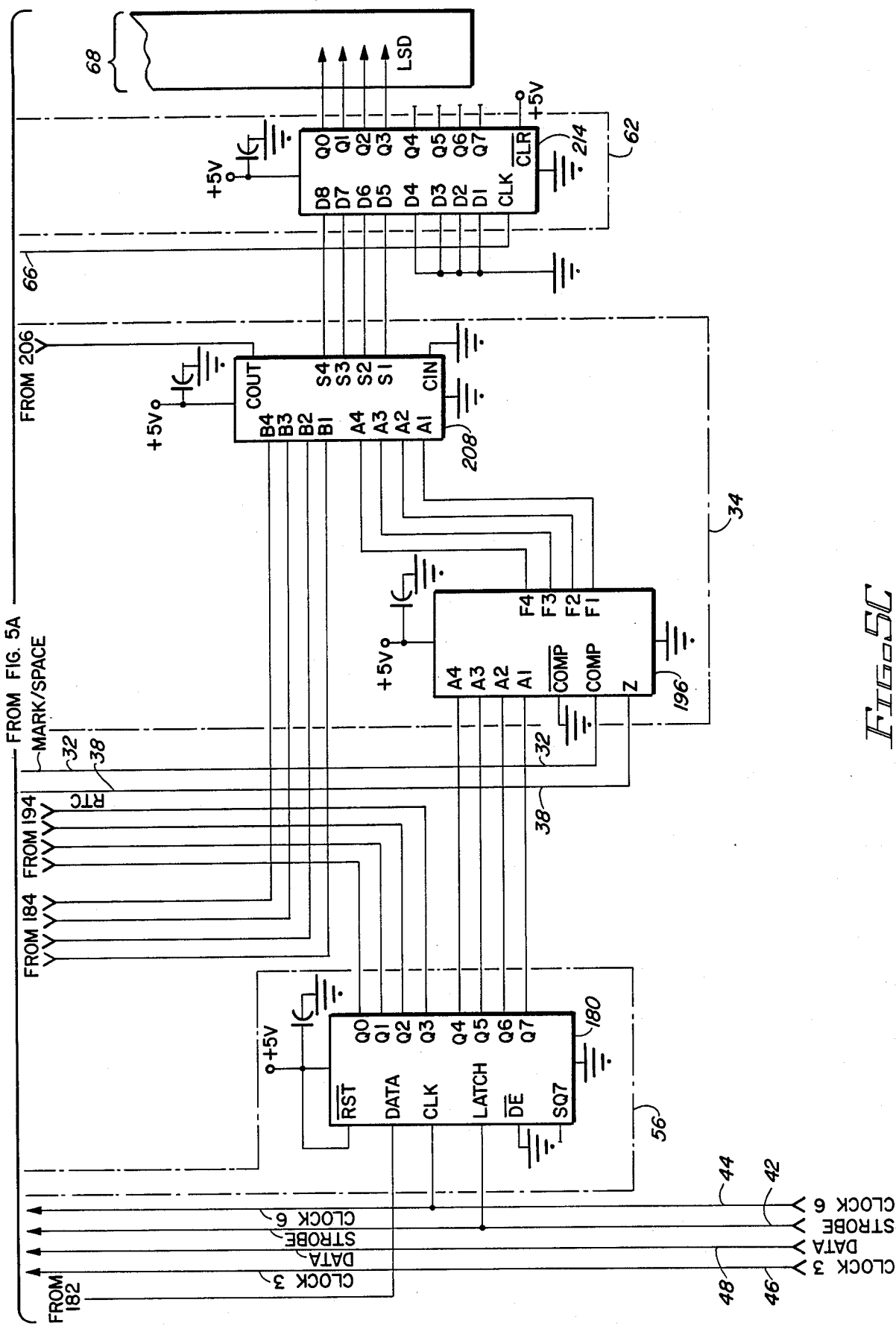

HYBRID FREQUENCY SHIFT KEYING MODULATOR AND METHOD

BACKGROUND OF THE INVENTION

The present invention relates, in general, to the field of frequency shift keying (FSK) modulators and methods. More particularly, the present invention relates to a hybrid frequency shift keying modulator and method for generation of synthesized radio frequency (RF) binary FSK signals of the types commonly used, for example, in land-mobile digital radio communication systems.

FSK is a fundamental digital modulation mode of broad application throughout the communications industry, particularly in the field of land-mobile signalling as a means of selectively addressing radio receivers (binary-coded squelch), and for digital transmission of messages to radio paging receivers. A binary-code representing the receiver's address or the message to be sent is transmitted as a serial string of ones and zeros by shifting the transmitter carrier frequency to one of two discrete values within the channel. Among the popular digital paging formats are POCSAG, NEC/D3 and GSC. Motorola's "digital private line" or "DPL" system is an example of a binary-coded squelch format.

Signal generators used in testing these receivers have a unique set of conflicting requirements placed upon them. Data rates vary from essentially zero to several hundred bps, and future systems may operate in excess of 10 k bps. POCSAG systems typically dwell for long periods of time on a one or zero between messages, and DPL requires simultaneous voice band analog FM. In all systems, the original code waveform must be preserved to comply with system bandwidth limitations. Of course, no degradation of the generator's basic frequency stability or lock-up time is tolerable and no significant disturbances in the phase-locked loop (PLL) should occur during frequency transitions. Automated test equipment (ATE) systems often require that the signal generator automatically return to the channel center frequency after code transmission to allow testing of the analog sections of the receiver. Moreover, inclusion of FSK should require the fewest possible changes to the existing generator circuitry.

The modulated carrier must respond faithfully to the original modulating waveform over a wide range of data bandwidths extending to essentially DC without attendant synthesized carrier frequency drift or significant disturbances of phase-locked loops used in generation of the carrier. Existing signal generators offering FSK capability are unable to meet all of the above requirements.

Three methods of applying FSK to signal generators have traditionally been used, each having objectionable disadvantages. Perhaps the simplest scheme involves applying the FSK signal to the generator as direct FM. This method provides good reproduction of the high frequency components of the modulating waveform but cannot reproduce low frequency components which fall within the loop bandwidth of the system. Reducing the modulated phase-locked loop bandwidth to obtain an improvement in low frequency modulation response typically results in an objectionable increase in loop lock-up time.

Conventional two point modulation schemes help somewhat, but in any case, such systems can never dwell more than momentarily on a one or zero if phase lock is to be maintained. Low data rate restrictions of this approach can be overcome by unlocking one of the synthesizer loops and DC coupling the FSK signal to the free running VCO. This method, therefore, allows good reproduction of both high and low frequency waveform components. However, the carrier frequency will drift objectionably, requiring frequent retuning.

Another method alternates the synthesizer frequency control data between two values representing one and zero. This system allows arbitrarily low data rates, infinite dwell on one or zero, and maintains good carrier frequency stability. Unfortunately, the data rate is limited to a value within the loop bandwidth. When the loop breaks lock during a frequency shift, a lock-up transient is produced which cannot be eliminated, only shortened in duration by increasing the loop bandwidth. Increasing the loop bandwidth, however, would make analog frequency modulation more difficult. Furthermore, such a system is incapable of preserving the FSK signal wave shape.

Other methods include the use of a form of analog digital converter to modulate the programming of a frequency divider chain in the PLL to produce DC coupled FM. This method produces objectionable frequency drift however, and manufacturers of direct digital synthesizers often modulate the programming data of the device although these systems also do not preserve wave shape information.

SUMMARY OF THE INVENTION

It is therefore an object of the present invention to provide an improved hybrid frequency shift keying modulator and method.

It is further an object of the present invention to provide an improved hybrid frequency shift keying modulator and method for use with a signal generator to provide a synthesized RF output signal corresponding faithfully to a modulating waveform over a wide range of data bandwidths without synthesized carrier frequency drift or disturbances of phase-locked loops used in the generation of the RF output signal.

It is still further an object of the present invention to provide an improved hybrid frequency shift keying modulator and method in which the input code wave shape is accurately reproduced without waveform tilt while simultaneously obviating low baud rate data restrictions and providing a maximum baud rate limited only by the slew rate of the modulated oscillator.

It is still further an object of the present invention to provide an improved hybrid frequency shift keying modulator and method which is readily incorporated into existing signal generators employing PLL and direct digital synthesis (DDS) sections for providing symmetrical, DC coupled binary carrier frequency shift keying (CFSK).

The foregoing and other objects and features of the present invention are achieved in the present invention wherein there is provided a frequency synthesizer including at least one phase-locked loop and direct digital synthesis sections for generation of a synthesized RF output signal corresponding to a digitally coded input signal wherein the improvement comprises an FSK modulator including means for modulating the phase-locked loop section in accordance with the input signal, means for deriving an FSK offset signal from the input signal and means for applying the FSK offset data to the direct digital synthesis section.

Also provided is a method for generation of a synthesized RF output signal corresponding to a digitally coded input signal which comprises the step of deriving analog and digital modulating signals from the input signal. A PLL section of a signal generator is modulated with the analog modulating signal and the digital modulating signal is applied to a DDS section of the signal generator.

Further provided is an FSK modulator for use in combination with a frequency synthesizer having PLL and DDS sections comprising means for deriving analog and digital modulating signals from a digitally coded input signal. Means are also provided for modulating the PLL section in accordance with the analog modulating signal with means for applying the digital modulating signal to the DDS section. High frequency response and wave shape reproduction of the input signal are maintained by modulation of the PLL section of the frequency synthesizer and low frequency response is maintained by modulation of the DDS section.

BRIEF DESCRIPTION OF THE DRAWINGS

The above mentioned, and other features and objects of the present invention and the manner of attaining them will become more apparent and the invention will be best understood by reference to the following description of an embodiment of the invention taken in conjunction with the accompanying drawings wherein:

FIGS. 5A–5C are schematic illustrations of the binary coded decimal (BCD) adder-subtractor, 20-bit data latch and DDS center frequency and digital FSK deviation registers of the embodiment of FIG. 1 for providing a digital modulating signal to the DDS section of the signal generator of FIG. 2.

DESCRIPTION OF A PREFERRED EMBODIMENT

Figure 1:
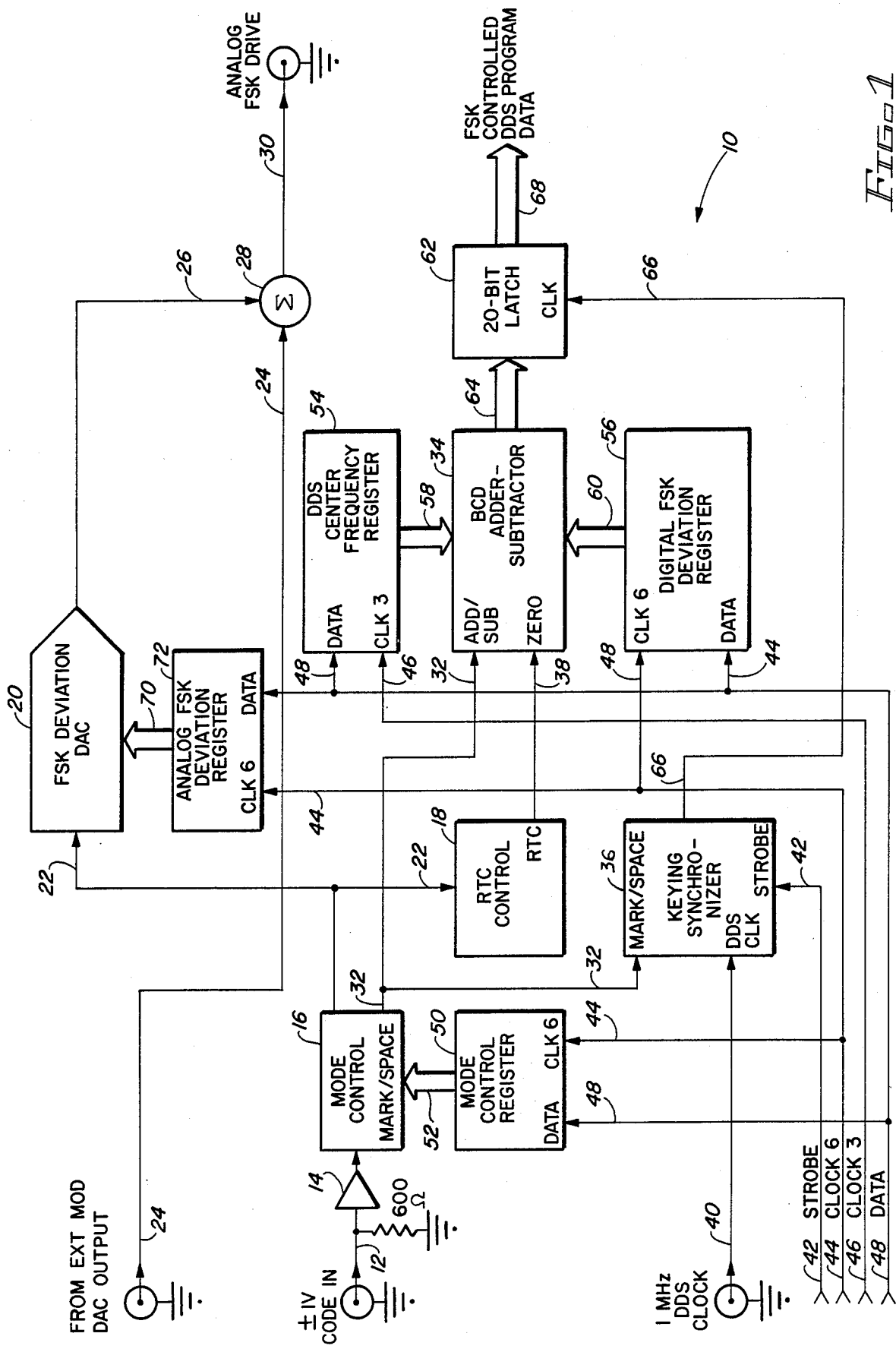
FIG. 1 is a simplified block diagram of an FSK modulator in accordance with the present invention illustrating the input of a digitally coded signal for the provision of analog and digital modulating signals for use in conjunction with, for example, a frequency synthesizer or signal generator.

With reference to FIG. 1, FSK modulator 10 in accordance with the present invention is shown. FSK modulator 10 receives a digitally coded input signal on code input line 12 for application through op amp 14 to mode control 16. Mode control 16 provides an analog output signal representative of the digitally coded input signal on mode control output line 22 for input to FSK deviation DAC 20 and RTC control 18. FSK deviation DAC 20 comprises, with analog FSK deviation register 72, an analog deviation circuit. Similarly RTC control 18 comprises in combination with DDS center frequency register 54 a return to center circuit.

FSK modulator 10 further receives an external modulation input signal on external modulation line 24 which is applied to summing circuit 28. Analog output of FSK deviation DAC 20 appearing on FSK deviation DAC output 26 is mixed with the external modulation signal appearing on external modulation line 24 for output on FSK drive output 30.

Mode control 16 further provides a mark/space output signal appearing on mark/space line 32 to provide an add-subtract signal to BCD adder-subtractor 34 as well as a mark/space input to keying synchronizer circuit 36. BCD adder-subtractor 34 comprises in combination with digital FSK deviation register 56 a digital deviation circuit. BCD adder-subtractor 34 further receives a return to center (RTC) input signal from RTC control 18 on RTC line 38 at its zero input thereof.

FSK modulator 10 further receives as input a 1 MHz DDS clock signal appearing on DDS clock input 40 from an associated signal generator such as the reference divider and modulation source shown. The clocking signal appearing on DDS clock input 40 is supplied to the clocking input of keying synchronizing 36 which further receives as input a strobe signal appearing on system strobe line 32. A clocking signal from the associated signal generator appearing on clock 6 line 44 is supplied as clocking input to mode control register 50, digital FSK deviation register 56 and analog FSK deviation register 72. Another clocking signal appearing on clock 3 line 46 is supplied as clocking input to DDS center frequency register 54. Data input to FSK modulator 10 is supplied on serial data line 48 for input to mode control register 50, DDS center frequency register 54 and digital FSK deviation register 56.

Mode control register 50 supplies digital mode control signals 52 to mode control 16 as shown. DDS center frequency register 54 and digital FSK deviation register 56 supply center frequency signals 58 and digital FSK deviation signals 60 to BCD adder-subtractor 34 also as shown. Output of BCD adder-subtractor 34 is applied to 20-bit latch 62 as DDS data signals 64 for subsequent output as DDS program data 68 when 20-bit latch 62 is enabled by keying synchronizer circuit 36 through a clocking signal appearing on clock line 66. Analog FSK deviation data signals 70 output from analog FSK deviation register 72 are applied to FSK deviation DAC 20.

Figure 2:
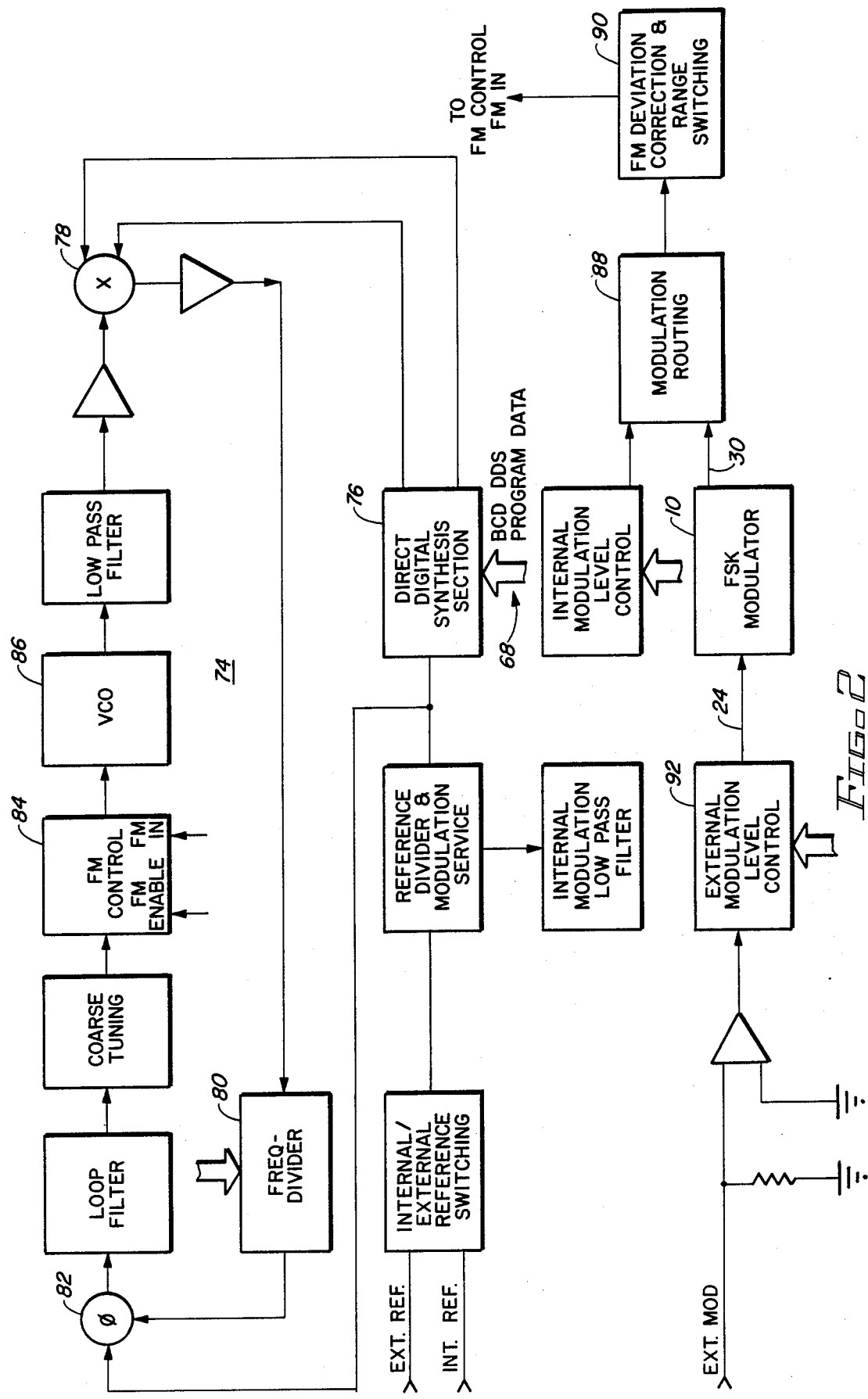
FIG. 2 is a simplified block diagram of the PLL and DDS sections of a signal generator for use in conjunction with the embodiment of FIG. 1 for providing a synthesized RF output signal in accordance with the analog and digital modulating signals provided by an FSK modulator according to the present invention.

Referring additionally now to FIG. 2, a portion of a signal generator incorporating a phase-locked loop (PLL) 74 and direct digital synthesis section (DDS) 76 is shown. Generally, phase-locked loop 74 includes a SSB mixer 78 as controlled by the output of direct digital synthesis section 76. A conventional mixer and associated filter might also be used in certain other applications. Phase-locked loop 74 further includes a programmable frequency divider 80, phase comparator 82 FM control circuit 84 and voltage controlled oscillator 86. FM control circuit 84 receives an FM input signal from FSK modulator 10 on analog FSK drive output 30 which may be applied through modulation routing circuit 88 and FM deviation correction and range switching circuit 90. FSK modulator 10 supplies DDS program data 68 directly to direct digital synthesis section 76 to provide an FSK offset signal thereto.

Figure 3:
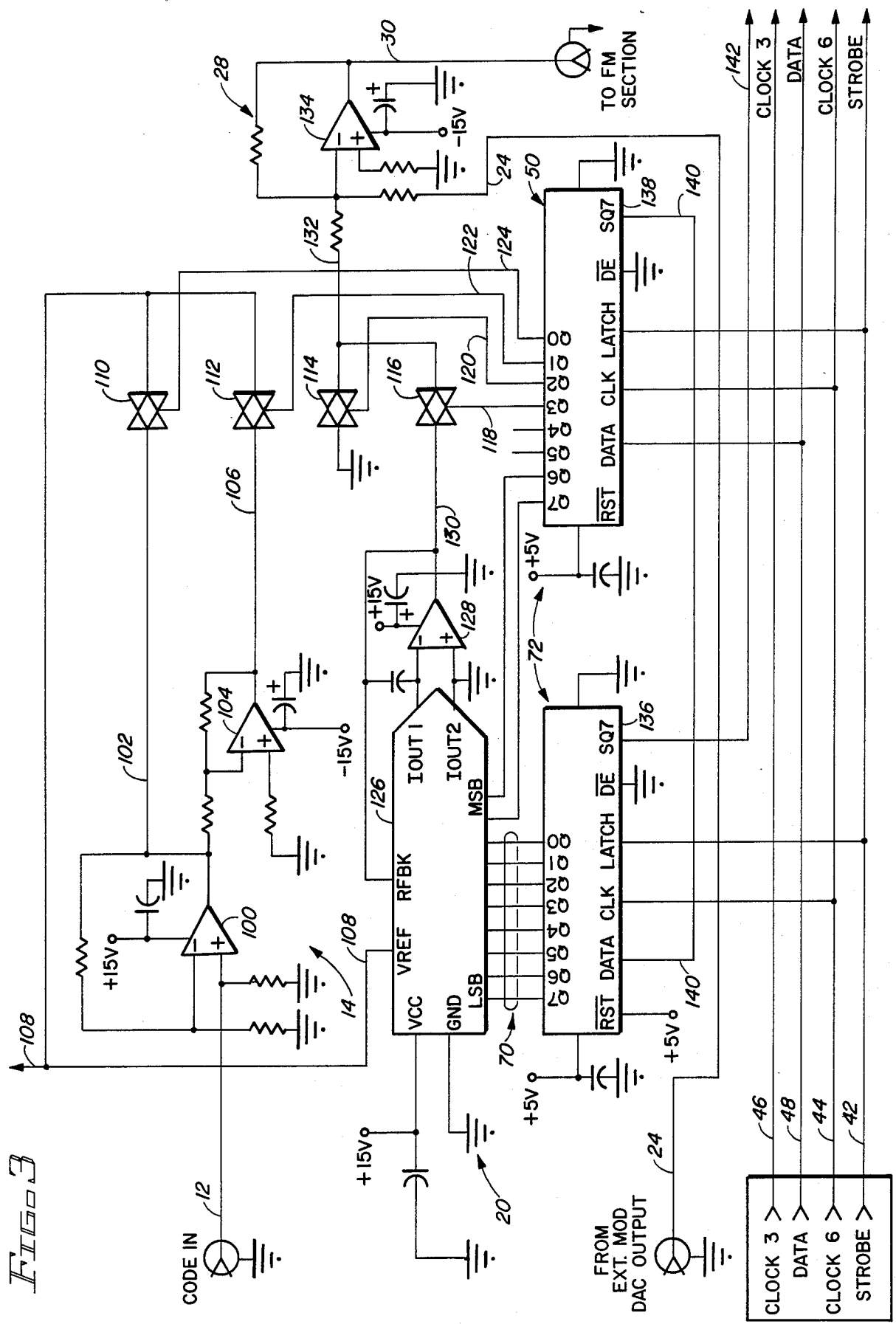
FIG. 3 is a schematic illustration of a portion of the embodiment of FIG. 1 showing a FSK deviation digital to analog converter (DAC), analog FSK deviation register and summing circuit for providing an analog modulating signal to the PLL section of the signal generator of FIG. 2.

With reference now to FIG. 3, the analog portion of FSK modulator 10 is shown in greater detail including FSK deviation DAC 20, analog FSK deviation register 72 and summing circuit 28. Like structure to that previously described is similarly numbered herein.

As previously described, a digitally coded input signal is applied on code input line 12 for amplification through op amp 14 comprising op amp 100 and series connected op amp 104. Output of op amp 100 appearing on line 102 is supplied as input to transmission gate 110 as controlled by control line 124 of serial/parallel shift register 138. In like manner, the output of op amp 104 is supplied as input to transmission gate 112 as controlled by serial/parallel shift register 138 by means of control line 122. Output from op amp 100 is in phase with the input code waveform, and is selected by transmission gate 110. Output from op amp 104 is out of phase with the code waveform and is selected by transmission gate 112. This selectable phase relationship is needed to allow for sideband inversion (and subsequent mark/space polarity reversal) that occurs when certain frequency synthesizers are in their heterodyne mode of operation (200 KHz to 137.4999 MHz). The sideband inversion problem is commonplace in frequency synthesizers which utilize a heterodyne approach as one of several methods of extending the frequency coverage of the basic synthesis section of the instrument. It usually manifests itself merely as a reversal of the modulation phase when the instrument is in the FM mode, which is typically of little consequence. The mark/space frequency shift phase relationship is of crucial importance in FSK systems, however.

The output of either transmission gate 110 or 112 in accordance with signals on control lines 124 and 122 respectively is applied to code line 108 for input to DAC 126 of FSK deviation DAC 20 as well as subsequent circuitry described more fully hereinafter.

Output of DAC 126 is supplied through op amp 128 for input on output line 130 to transmission gate 116. Transmission gate 116 is controlled by an FSK enable signal appearing on control line 118 from serial/parallel shift register 138. Output of transmission gate 116 is connected in common with the output of transmission gate 114 having its input coupled to circuit ground. Transmission gate 114 is controlled by serial/parallel register 138 with control line 120 providing an FSK disable signal. Output of FSK deviation DAC 20 appearing on FSK output line 132 is combined with an external modulation output signal appearing on external modulation line 24 and amplified by means of op amp 134 to provide an analog modulating signal appearing on analog FSK drive output 30.

Analog FSK deviation register 72 comprises serial/parallel shift registers 136, 138 for supplying analog FSK deviation signals 70 to FSK deviation dac 20 as shown. Signal generator data input appearing on serial data line 48 is supplied as input to the data terminal of serial/parallel shift register 138 and, serially, by means of data line 140 to the data input of serial/parallel shift register 136. Serial data is then supplied to subsequent circuitry by means of data line 142.

Figure 4:
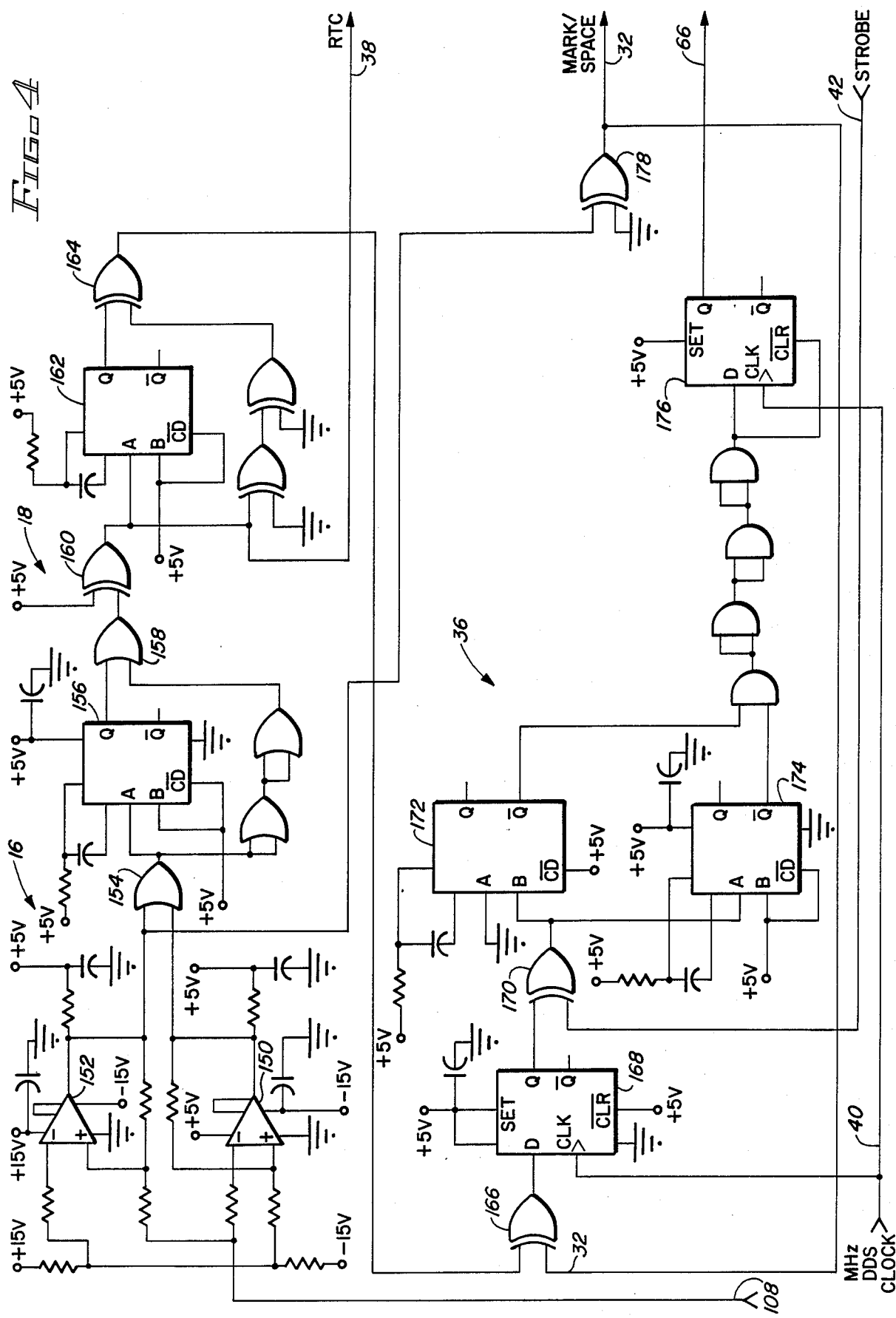
FIG. 4 is a further schematic illustration of a portion of the embodiment of FIG. 1 showing, inter alia, the mode control, return to center (RTC) control, and keying synchronizer circuits.

Referring additionally to FIG. 4, a more detailed schematic diagram of the mode control 16, RTC control 18 and keying synchronizer circuit 36 of FSK modulator 10 is shown. The amplified digitally coded signal appearing on code line 108 is supplied to the inverting input of comparator 150 as well as the non-inverting input of comparator 152. Outputs from comparators 150, 152 are furnished as inputs to or gate 154, the output of which is coupled to the "A" input of monostable multivibrator 156. The output of OR gate 154 and the "Q" output of monostable multivibrator 156 are logically ORed through OR gate 158 for input to exclusive or gate 160 for supplying an inverted output to the "A" input of monostable multivibrator 162. The output signal of Exclusive OR gate 160 and the "Q" output of monostable multivibrator 162 are exclusively ORed through Exclusive OR gate 164 for providing an input to Exclusive OR gate 166.

Output of comparator 152 is also furnished as an input to Exclusive OR gate 178 having its other input tied to circuit ground. The output of Exclusive OR gate 178 provides a mark/space signal on mark/space line 32 for supplying an add-subtract input to BCD adder-subtractor 34. Mark/space line 32 is further connected to one input of Exclusive OR gate 166 having its other input connected to the output of Exclusive OR gate 164. The output of Exclusive OR gate 166 is supplied to the "D" input of flip flop 168 which is clocked by the 1 MHz clocking signal appearing on DDS clock input 40. The output of flip flop 168 is furnished as one input to Exclusive OR gate 170 having its other input connected to a strobe signal appearing on system strobe line 42. The output of Exclusive OR gate 170 is supplied to the "D" and "A" inputs of monostable multivibrators 172, 174 respectively. The inverted outputs of monostable multivibrators 172, 174 are amplified and supplied to "D" input of flip flop 176. A clocking signal for input to 20-bit latch 62 is supplied as output of flip flop 176. As shown, the output of Exclusive OR gate 160 provides a return to center signal to BCD adder-subtractor 34 on RTC line 38.

Referring additionally now to FIGS. 5A–5C, more detailed schematic illustrations of BCD adder-subtractor 34, DDS center frequency register 54, digital FSK deviation register 56 and 20-bit latch 62 is shown for developing and supplying a digital modulating signal to the DDS section of a signal generator.

DDS center frequency register 54 comprises a number of serial/parallel shift registers 184, 186 and 188. Data input to DDS center frequency register 54 is supplied on serial data line 48 for input to the "data" terminal of serial/parallel shift register 186 and, in turn, to serial/parallel shift registers 188 and 184. DDS center frequency register 54 receives a clocking input from clock 3 line 46 and a strobe signal on system strobe line 42 is supplied to the latch inputs of DDS center frequency register 54.

Digital FSK deviation register 56 comprises serial/parallel shift registers 180 and 182. Data input is taken from serial/parallel shift register 188, a clocking signal is taken from clock 6 line 44 with a latching signal taken from system strobe line 42.

Outputs of serial/parallel shift registers 184, 186 and 188 are supplied directly as inputs to terminals "B1–B4" of BCD adders 198, 200, 204, 206 and 208. BCD adder 198 also receives as input at pin "A4" the signal appearing on mark/space line 32. Outputs of digital FSK deviation register 56 are supplied as inputs to 9's complementers 190, 192, 194 and 196. 9's complementers 190, 192, 194 and 196 receive a return to center signal on RTC line 38 and a mark/space signal on mark/space line 32. Outputs of 9's complementers 190, 192, 194 and 196 are applied respectively to the "A1–A4" inputs of BCD adders 200, 204, 206 and 208 respectively.

Digital data representing an FSK offset from BCD adder-subtractor 34 are input to 20-bit latch 62 comprising octal D-type flip flops 210, 212 and 214. The digital FSK offset signal input to 20-bit latch 62 is clocked to the outputs thereof in the form of DDS program data 68 upon receipt of a clocking signal on clock line 66 from keying synchronizer 36.

Figure 6:
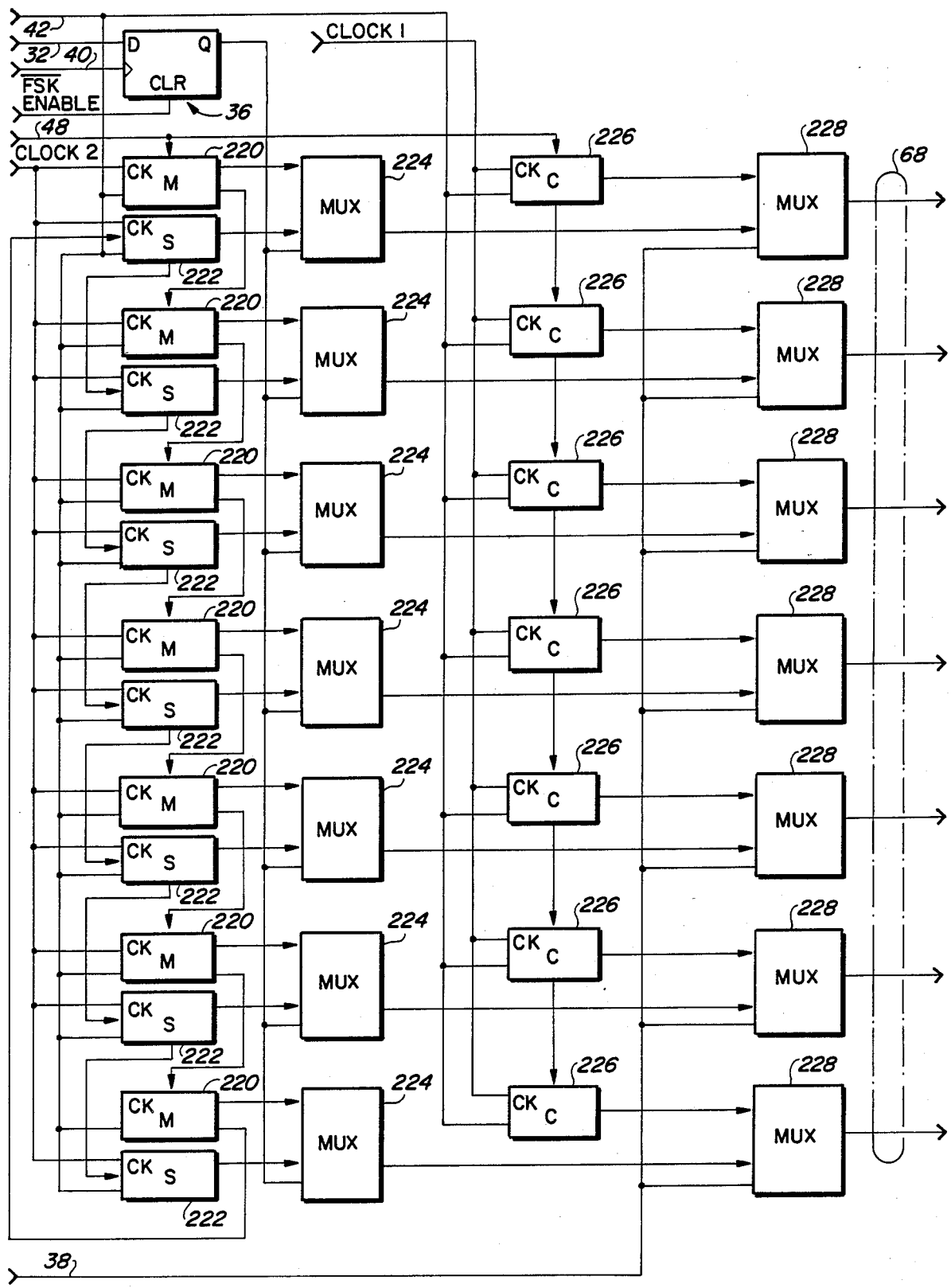
FIG. 6 is a schematic illustration of an alternative embodiment to the adder-subtractor arrangement of FIGS. 5A–5C using multiplexed registers.

In addition to the adder/subtractor method shown in the embodiment of FIGS. 5A–5C, a multiplexed data register technique or direct computation technique can also be used, the former being shown in FIG. 6 wherein like structure to that above-described with respect to the preceding figures is like numbered and the foregoing description shall suffice herefor. The multiplexed register technique shown involves loading into a conventional register or memory device such as a plurality of mark registers 220 and space registers 222, the absolute DDS frequency programs corresponding to logical one and zero. The two banks of frequency control data are then selectively applied to the DDS by means of a multiplexer comprising individual multiplexers 224 controlled by the digital mark/space line 32. RTC, or return-to-center, is accomplished by third "center frequency" registers 226 which are selected by multiplexers 228 upon command from the RTC circuits.

Although not illustrated, through use of a third technique it is also possible to apply the digital FSK modulation to the DDS by computing in real time, (by a microprocessor control section or other computing device) the instantaneous logical one or zero DDS program. RTC would be accomplished in this case by simply supplying the appropriate center frequency data in like manner. This data could be applied to the DDS by any convenient I/O device such as a shift register. The analog portions of the system would not change fundamentally with any of the three methods described.

FSK modulator 10 is an optimal hybrid of digital and analog modulation techniques. A bipolar FSK code waveform applied to code input line 12 is converted to a TTL level and reclocked by the 1 MHz reference of the DDS section of the signal generator as applied to DDS clock input 40. The reclocked FSK signal is supplied to BCD adder-subtractor 34 which controls the DDS program, shifting it above or below its center frequency by an amount equal to an FSK deviation value supplied by the signal generator software. The FSK code amplitude is scaled according to the desired deviation and applied as an analog signal to the normal FM circuits of the signal generator. Were only the DDS section 76 modulated, a phase error would exist between the phase comparator inputs when the frequency shifts since voltage controlled oscillator 86 cannot respond instantaneously to the change in DDS frequency. In addition, the analog wave shape information in the FSK code input signal would be lost. Moreover, the maximum data rate is restricted by the loop bandwidth.

If only the FM control circuit 84 were modulated the minimum data rate is then dependent upon the loop bandwidth. The high frequency components of the FSK code waveform would be reproduced but excessive waveform tilt would result at low data rates. In combining the analog and digital modulation techniques, the advantages of each individual technique accrue with none of the disadvantages of either alone.

The simultaneous application of the FSK code waveform as direct FM dynamically "pretunes" voltage control oscillator 86 sufficiently close to its final frequency that the phase error produced by shifting the DDS is virtually eliminated. Since the data rate at which the FM begins to degrade is the same rate at which the modulation of the DDS begins to dominate, the poor low frequency response of the FM section and the poor high frequency response of the DDS modulator are both compensated. No noticeable loop lockup transient occurs and the maximum data rate is limited only by the generator's FM frequency response and not by the bandwidth of phase-locked loop 74. Therefore, the system can dwell indefinitely on a logic 1 or 0 and the wave shape of the FSK code is preserved. In other words, the low frequency performance is derived from the characteristics of the DDS modulation and the high frequency performance and accurate wave shape replication are derived from modulation of the direct FM section.

What has been provided therefore, is an improved hybrid frequency shift keying modulator and method for use with a signal generator to provide a synthesized RF output signal corresponding faithfully to a modulating waveform over a wide range of data bandwidths without synthesized carrier frequency drift or disturbances of the phase-locked loop used in the generation of the RF output signal. The modulator and method of the present invention accurately reproduces the input code wave shape without waveform tilt while simultaneously obviating low baud rate data restrictions and providing a maximum baud rate limited only by the slew rate of the modulated oscillator. The hybrid frequency shift keying modulator and method disclosed is readily incorporated into existing signal generators employing PLL and DDS sections for providing symmetrical, DC coupled binary carrier frequency shift keying.

While there have been described above the principals of the present invention in conjunction with specific apparatus and circuitry, it is to be clearly understood that the foregoing description is made only by way of example and not as a limitation to the scope of the invention.

What is claimed is:

1. A frequency synthesizer including phase-locked loop and direct digital synthesis sections for generation of a synthesized RF output signal corresponding to a digitally coded input signal wherein the improvement comprises an FSK modulator comprising:
   means for modulating said phase-locked loop section in accordance with said input signal;
   means for deriving an FSK offset signal from said input signal; and
   means for applying said FSK offset signal to said direct digital synthesis section.

2. The frequency synthesizer of claim 1 wherein said modulating means comprises a summing circuit.

3. The frequency synthesizer of claim 2 wherein said modulating means further comprises an analog deviation register.

4. The frequency synthesizer of claim 3 wherein said modulating means further comprises a digital to analog converter receiving digital control signals from said analog deviation register.

5. The frequency synthesizer of claim 1 wherein said deriving means comprises a mode control circuit.

6. The frequency synthesizer of claim 1 wherein said deriving means comprises mark/space and center frequency registers.

7. The frequency synthesizer of claim 6 further comprising a return to center control circuit.

8. The frequency synthesizer of claim 5 further comprising an adder-subtractor responsive to said mode control circuit.

9. The frequency synthesizer of claim 8 further comprising a digital deviation register supplying digital control signals to said adder-subtractor.

10. The frequency synthesizer of claim 1 wherein said applying means comprises a latch circuit coupled to the output of said deriving means.

11. The frequency synthesizer of claim 10 further comprising a keying synchronizer circuit for supplying a clocking signal to said latch circuit.

12. The frequency synthesizer of claim 8 further comprising a center frequency register for supplying digital control signals to said adder-subtractor.

13. The frequency synthesizer of claim 12 further comprising a return to center control circuit responsive to said mode control circuit for supplying a return to center signal to said adder-subtractor circuit.

14. A method for generation of a synthesized RF output signal corresponding to a digitally coded input signal comprising the steps of:
deriving analog and digital modulating signals from said input signal;
modulating a PLL section of a signal generator with said analog modulating signal; and
applying said digital modulating signal to a DDS section of said signal generator.

15. The method of claim 14 wherein said step of deriving is carried by means of analog and digital deviation circuits.

16. The method of claim 14 wherein said step of modulating is carried out by inputting said analog modulating signal to a frequency modulation circuit in said PLL section.

17. The method of claim 14 wherein said step of applying is carried out by providing said digital modulating signal as parallel program data to said DDS section.

18. An FSK modulator for use in combination with a frequency synthesizer having PLL and DDS sections comprising:
means for deriving analog and digital modulating signals from a digitally coded input signal;
means for modulating said PLL section in accordance with said analog modulating signal; and
means for applying said digital modulating signal to said DDS section;
whereby high frequency response and wave shape reproduction of said input signal are maintained by modulation of said PLL section of said frequency synthesizer and low frequency response is maintained by modulation of said DDS section.

19. The FSK modulator of claim 18 wherein said deriving means comprises analog and digital deviation circuits.

20. The FSK modulator of claim 19 further comprising a return to center frequency circuit associated with said digital deviation circuit.

21. The FSK modulator of claim 18 wherein said modulating means comprises a frequency modulation circuit in said PLL section responsive to said analog modulating signal.

22. The FSK modulator of claim 18 wherein said applying means comprises a digital program data bus for providing said digital modulating signal to said DDS section.

23. The FSK modulator of claim 18 wherein said modulating means comprises a summing circuit.

24. The FSK modulator of claim 23 wherein said modulating means further comprises an analog deviation register.

25. The FSK modulator of claim 24 wherein said modulating means further comprises a digital to analog converter receiving digital control signals from said analog deviation register.

26. The FSK modulator of claim 24 wherein said deriving means comprises a mode control circuit.

27. The FSK modulator of claim 18 wherein said deriving means comprises mark/space and center frequency registers.

28. The FSK modulator of claim 27 further comprising a return to center control circuit.

29. The FSK modulator of claim 26 further comprising an adder-subtractor responsive to said mode control circuit.

30. The FSK modulator of claim 29 further comprising a digital deviation register supplying digital control signals to said adder-subtractor.

31. The FSK modulator of claim 18 wherein said applying means comprises a latch circuit coupled to the output of said deriving means.

32. The FSK modulator of claim 31 further comprising a keying synchronizer circuit for supplying a clocking signal to said latch circuit.

33. The FSK modulator of claim 29 further comprising a center frequency register for supplying digital control signals to said adder-subtractor circuit.

34. The FSK modulator of claim 33 further comprising a return to center control circuit responsive to said mode control circuit for supplying a return to center signal to said adder-subtractor circuit.

* * * * *